Jan. 9, 1951  A. R. C. MARKL  2,537,776
APPARATUS FOR MAKING WELDED PIPE JOINTS
Filed April 2, 1946
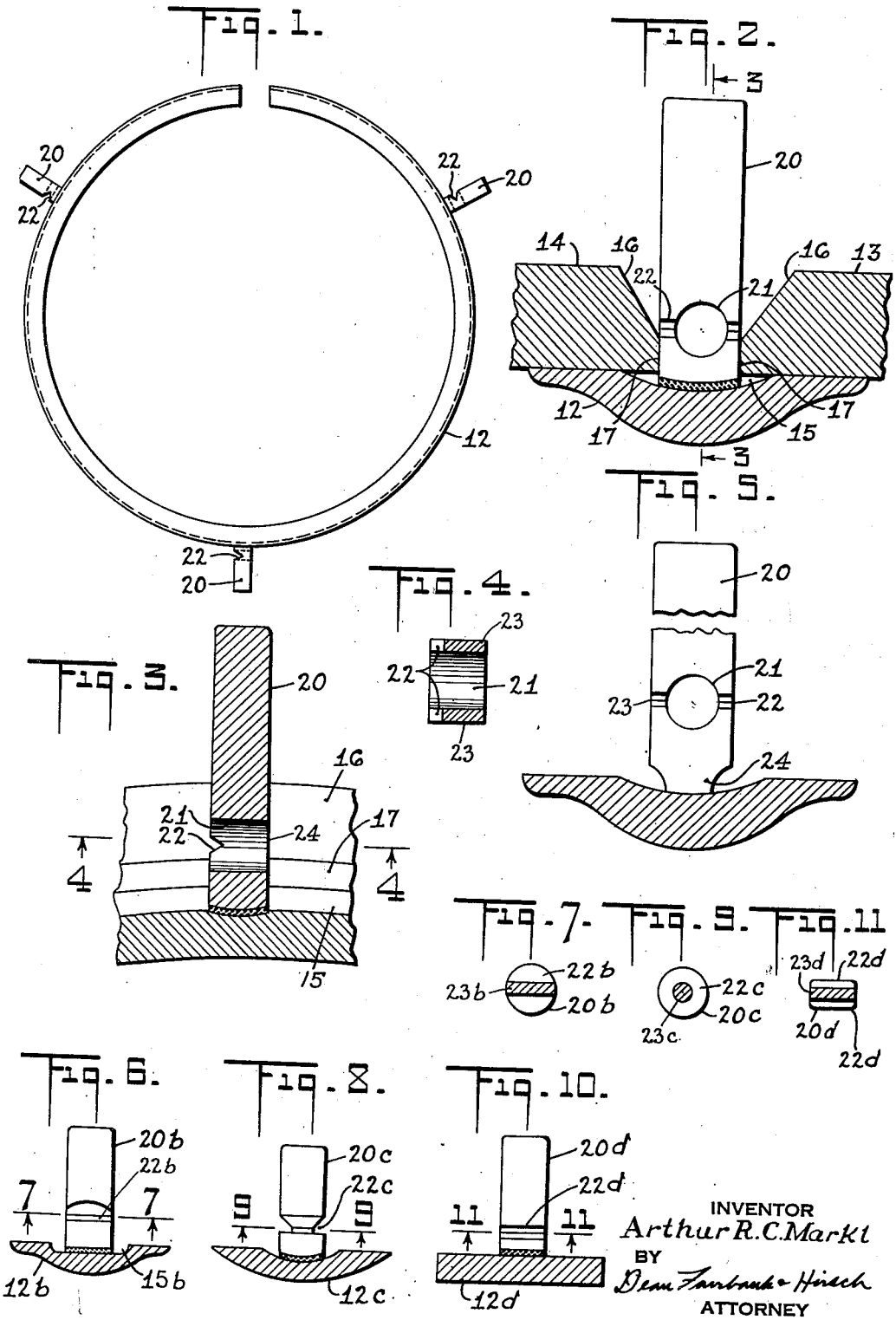
INVENTOR
Arthur R. C. Markl
BY
ATTORNEY Patented Jan. 9, 1951

2,537,776

UNITED STATES PATENT OFFICE 2,537,776

APPARATUS FOR MAKING WELDED PIPE JOINTS

Arthur R. C. Markl, Louisville, Ky., assignor to Tube Turns, Inc., a corporation of Kentucky Application April 2, 1946, Serial No. 658,978

4 Claims. (Cl. 285—111)

This invention relates to the art of fusion butt welding together the ends of metal pipes, tubes, elbows, tees, reducers, flanges, and other forms of pipe fittings or similar tubular members, all of which are hereinafter for brevity sometimes referred to generally as pipes or tubes, by the use of deposited weld metal and a metal welding ring which is telescoped into the ends of the tubular members which are to be welded together.

Welding or backing rings are a recognized means of securing good fusion at the root of welds and preventing the formation of irregular projections, commonly referred to as icicles, on the inside of the joint. Also, the incorporation of means capable of originally spacing the ends of the tubular members a predetermined amount and maintaining that spacing throughout the deposition of the first circumferential bead of the weld metal, while preventing the formation of icicles, is know to be desirable, particularly in metallic arc welding. The reason is that the spacing between the abutting ends of the tubular members to be welded must be slightly greater than the diameter of the welding electrode if complete fusion of the pipe is to be attained. But as the first circumferential weld bead is deposited, it cools and contracts, progressively drawing the ends of the tubular members being welded towards each other, thus decreasing the space between them previously determined to be necessary for the size electrode being used. Without some means of preventing such reduction of the desired spacing, incomplete fusion of the pipe ends, as the first bead or pass is nearing completion, is almost certain to occur.

The problem has been how to provide such spacing means without detriment to the quality of the weld. As one expedient, there have been employed welding rings provided with continuous ridges on the outside of the ring and arranged to project between the ends of the tubular members to be welded, but these in some cases have been found to be undesirable as reducing the depth of fusion and providing possible starting points for radial cracks, thus tending to defeat the primary purpose of the spacing means.

Also, there have been employed welding rings provided with a plurality of spaced studs, pins, or other projecting members serving as root gap gauges, and arranged circumferentially thereof on the outer surface, and against which the tube ends abut to hold the tube ends in alignment, and so that the tube ends can be spaced a predetermined distance apart to permit weld metal to enter therebetween. If such projections be shallow, they avoid the disadvantages of continuous ridges, but they are not always adequate as spacing means due to the relatively large commercial variation in the inside diameters of pipes of the same nominal size, and the projecting spacing members may not properly engage the lands at the ends of the pipes. Larger or more massive spacers interposed between the lands, on the other hand, may introduce discontinuities in the weld. Moreover, such projecting spacing members sometimes are of a different composition from the weld metal so that, as such members become melted, there is produced a weld of non-uniform composition. Also, such massive spacing members sometimes are only partially melted and a relatively large unmelted portion becomes embedded in the weld and thus makes the weld of non-uniform structure.

In the use of welding rings with spaced outwardly projecting spacer members, it has been proposed first to tack weld the pipe ends and welding ring together at points between the spacer members, and then melt or burn off the projecting ends of the spacer members by the use of a torch used in the welding, but this takes time, and the ends melted off may fall into the molten metal and become incorporated in the joint. Furthermore, there is no uniformity or certainty as to the amount of each spacer that is left in the welding groove, as it is difficult, if not impossible, to burn off the same amount of each spacer, and in any event the burning off cannot very well be done at the bottom of the welding groove, and a considerable amount of each spacer is left in the groove. When electric arc welding is employed, such expedient of melting or burning off the outer ends of the spacer members of course cannot be resorted to.

An important object of my invention is to provide a welding ring having spacers for the pipe ends, and so formed that the major portion of each spacer may be easily, quickly and uniformly broken off below the outer surface of said pipe ends, and at a predetermined point close to the bottom of the welding groove and discarded after the start of the welding operation. Thus, only a relatively short but uniform part of each spacer becomes melted into the deposited metal and incorporated in the weld, and a uniform weld is obtained. Another advantage is that such ring can be employed in either arc or torch welding.

A further object is to decrease the unit stress created on the spacers by the contracting force created by the cooling of the deposited metal, and thus limit the movement of the tube ends toward each other. This is accomplished in certain embodiments of my invention by providing the spacers with substantially flat faces for contacting said ends.

In carrying out my invention, the spacers which are secured to and carried by the welding ring, are so made that they have a greatly weakened portion adjacent to but spaced only a short distance from the ring, so that after tack welding of the ends of the pipes or other tubular members to be welded, the outer projecting portion of each spacer member may be quickly and easily broken off at a predetermined point in between the tube ends, and discarded. The breaking may be effected by hitting the outer end a light side blow with a hammer, which causes the end portion to fly away as it breaks, and the remaining portion, being small and of large surface area in relation to its volume, becomes largely if not completely melted during the completion of the welding operation.

Pipe ends to be butt welded are usually beveled so that a groove is formed between the ends, but in beveling the pipe ends there is usually left a narrow transverse end surface or land. In carrying out the present invention, the weakening of the spacers is preferably of such a character and so positioned above the welding ring that the spacers present adequate surfaces against which the transverse end surfaces or lands of the pipe ends may firmly abut and bring the pipe ends into alignment with predetermined spacing for the weld metal. The weakening of the spacing members is preferably approximately opposite the greatest diameter of the land on the pipe ends so that the bottom portions of the spacers which remain in place and become at least partially melted and incorporated in the weld after the breaking off of the outer end portions, will be as small as practical.

The weakening of the spacer members may be effected in various different ways, as for instance by forming a groove in or around the member, or by forming a transverse hole through the member at a point adjacent to the end thereof which is secured to the body of the welding ring, or by partially cutting the spacer in two, or in various other ways.

The weakening is preferably effected by cutting or otherwise forming a notch in the side of or around the spacer. Additional weakening may be effected by providing a hole transversely through the spacer at the location of the notch. Such notch should be sharp at its inner end so as to form a well defined line from which fracture may easily start when a lateral blow is applied to the outer end of the spacer and thus to control and define the location of the fracture. The notch also should be so located as to leave the minimum amount of the spacer in place after the fracture, but preferably is not disposed within the maximum diameter of the lands on the pipe ends. Thus, in its initial form and before its outer end is broken off, the spacer pin is amply long to insure definitely that the full width of the lands on the pipe ends will under all circumstances bear against the spacer pin. Such weakening of the spacing members should not be to such an extent as will cause any liability of said members being accidentally broken off during reasonable handling or shipment of the welding rings.

The projecting ends of the spacer pins are readily broken off after tack welds are made at locations between the spacer pins. No special tools are required for this purpose, the presence of the notch, or the notch and hole combined, providing a sufficiently weakened section that a blow with a peening hammer will break off the part of the spacer pin located outside of the notch. This outer portion of the spacer pin is designed to project well beyond the outside of the pipe and thereby to provide an increased leverage for effecting the breaking and ready access for applying the hammer blow. In view of the gripping action exerted on the spacer pin as a result of shrinkage of the tack welds, the notch preferably is located so as to come a slight distance outside the maximum diameter of the land when there is theoretically perfect alignment between the inside surfaces of the pipes. This serves to insure that the gripping action does not extend to the outer portion of the spacer pin, even where the inside diameters of the pipe vary. If a strong grip were exerted on the outer portion of the spacer pin this might make it difficult to break it off.

The hole in the spacer pin, when provided, not only serves as a local weakening but also helps to reduce the volume of spacer pin metal to be melted into the first bead of actual welding. It further aids the melting down of this metal by leaving a ridged contour, exposing an increased surface area to the welding heat.

The cross-sectional form of the welding ring per se may be similar to any of the various types commonly employed, but in its preferred form it has a circumferential groove in the outer surface slightly wider than the ends of the spacing members to receive the latter and permit proper welding of the spacers to the ring. The welding ring also preferably has its inner surface convexedly curved to comparatively thin edges so as to offer the minimum resistance to the flow of fluids through the pipe after the welding has been completed. The spacers are preferably secured to the ring by resistance welding, but may be secured thereto in any other suitable manner.

In the accompanying drawing I have illustrated several different embodiments of my invention, but it will be understood that various other forms may be employed within the scope of my invention, as hereinafter defined.

Fig. 1 is an end view of a welding ring having spacer pins embodying my invention;

Fig. 2 is a transverse section on a larger scale, showing the ring in position within and between two spaced pipe ends;

Fig. 3 is a section on the line 3—3 of Fig. 2;

Fig. 4 is a transverse section on the line 4—4 of Fig. 3;

Fig. 5 is a view similar to a portion of Fig. 2, but before resistance welding of the spacer pin to the ring;

Figs. 6, 8 and 10 are views similar to a portion of Fig. 2, but showing different forms of spacers and different forms of welding rings after the welding together of the spacer and the ring; and Figs. 7, 9 and 11 are sections on the lines 7—7, 9—9 and 11—11 of Figs. 6, 8 and 10, respectively.

As shown in Fig. 1, the welding ring 12 may be constructed of a strip of metal bent to form a band of substantially cylindrical form with a gap between the ends of the strip so that the band may be slightly contracted due to the resiliency of the metal, and inserted into the ends 13 and 14 of the pipes or other tubular members to be welded and then permitted to expand to snugly engage the inner surfaces. The band is here shown as formed with a circumferential groove 15 on the outer surface of the ring, and of a width preferably slightly greater than the width of the spacers. One end of each spacer is secured to the ring 12 within the groove 15 and preferably by resistance welding, although other methods of joining the spacers to the ring may be employed. The number of spacers may vary, but there should be at least three of them. If desired, two of the spacers may be located respectively adjacent to each of the ends of the band forming the ring so as to insure the holding of these ends against relative lateral displacement when the ring is inserted in the pipe ends.

The pipe ends 13 and 14 have beveled surfaces 16 so as to form a groove to receive the weld metal, but these bevels do not extend all the way to the inner surfaces of the pipe so that there are left comparatively narrow transverse end surfaces or lands 17 which may abut against and snugly grip the bottom portions of the spacers. In addition to the usual function of the groove 15, it has an added advantage in that any irregularity resulting from the welding of the end of a spacer pin to the ring will be in the groove, and not between the lands 17.

As previously noted, the spacers or root gap gauges may be of various different forms, and the weakening may be effected in various different ways.

In the form shown in Figs. 1 to 5 inclusive, the spacer pin 20 presents a pair of flat opposed surfaces for contact with the lands 17 of the pipe ends. It is shown as rectangular in cross-section, but it is immaterial whether or not the other two surfaces be flat, convex or concave. The weakening is effected by the drilling of a hole 21 through the spacer pin, and by cutting or otherwise forming a notch 22 in at least one side of the spacer pin approximately in the transverse plane of the center of the hole 21, and closely adjacent to the inner edges of the bevels 16, so as to leave portions 23 of small cross-sectional area. Thus, when the outer portion of the spacer pin is broken off, substantially all of the remaining portions will be between the lands 17. As the hole 21 extends below as well as above the notch, the amount of metal in the remaining portion of the spacer pin will be comparatively small.

In Fig. 5 there is shown the assembly of ring and spacer pin as in Fig. 2, but before resistance welding of the two together. The spacer at the inner end portion 24 is of somewhat reduced diameter so that during the resistance welding of the pin to the ring, the end portion of the pin may be partially melted or softened, and end pressure will shorten the length and spread metal outwardly so that the pin will come to the form shown in Fig. 2. The initial reduction eliminates the liability of any metal flowing out beyond the circumference of the pin proper to interfere with the snug engagement, either of the ring with the inner surfaces of the pipe ends, or of the spacer pin with the end surfaces or lands of the pipe ends.

In the construction shown in Figs. 6 and 7, the pin 20b is circular in cross-section, instead of being rectangular, and the weakening is effected by cutting comparatively deep notches 22b in opposite sides so as to leave a comparatively narrow section 23b which may be readily broken.

In Figs. 8 and 9 there is shown a construction similar to that shown in Figs. 6 and 7, but the pin 20c has the weakening notch in the form of an annular groove 22c so that there is left a centrally disposed comparatively small portion 23c which is readily broken off.

In Figs. 10 and 11 the spacer pin 20d is rectangular in cross-section, and two notches in the form of grooves 22d are cut into opposite sides to leave a central portion 23d of reduced cross-sectional area.

As previously noted, the welding ring itself may be of various cross-sectional forms. The ring 12b, shown in Fig. 6, has a somewhat different form of groove 15b than in Fig. 2. In Fig. 8, the ring 12c is again of somewhat different cross-sectional shape; and in Fig. 10 the ring 12d is formed of a flat band of metal without any peripheral groove. The ring preferably has comparatively thin marginal edges so that the flow of fluid through the pipe will be impeded to the minimum extent, although, as shown in Fig. 10, the ring may have edge surfaces at right angles to the inner and outer surface.

In the use of the welding ring, the ends at the gap shown in Fig. 1 are brought toward each other to reduce the diameter of the ring, and the pipe ends are telescoped onto the ring to abut against the spacer pins, and the ring ends released so that the ring expands and is frictionally held in place with the pipe ends or lands gripping the spacer pins below the notches in the latter. The pipe ends and the ring are then tack welded at points between the pins, and the pins are then hit with a hammer or other tool to snap them off at the weakened points. The welding is then completed by adding welding metal to fill the space between the pipe ends, and during this operation the remaining inner ends of the spacers become completely, or substantially completely, melted and incorporated in the added metal. Thus the welded joint is substantially homogeneous, and the pipe ends are secured together and to the welding ring by a weld which is uniform throughout its length.

Having thus described my invention what I claim as new and desire to secure by Letters Patent is:

1. A device adapted for use in welding together the ends of tubular members, said device including an expansible ring formed of a metal band having a plurality of spaced outwardly extending studs intermediate of the side edges of the band and around the periphery of the ring, each of said studs being of greater length than the wall thickness of the tubular members to be connected, and each stud having a weakened point at a distance from the band less than the wall thickness of said tubular members, whereby said tubular members may be telescoped onto said ring and against said studs and the parts tack welded together, and thereafter said studs may be broken off at their weakened points within the space between the ends of said tubular members and said space filled with welding metal.

2. An assembly for welding, comprising a pair of tubular members each having a beveled end surface extending to the outer peripheral surface and a narrow transverse land adjacent to the inner surface, a welding ring telescoped into said members and having outwardly extending spacers intermediate of opposite edges thereof and against which said lands abut, said spacers being weakened at a point adjacent to the intersection of said beveled end surfaces and said lands whereby the outer end portions of said spacers may be easily broken off after tack welding of said tubular members and said ring and before completing of the weld by filling the groove between said members with welding metal.

3. A device for use in welding together the ends of a pair of tubular members, said device including an expansible ring formed of a metal band adapted to be telescoped into the ends of said tubular members to be welded together, said band having a plurality of outwardly extending studs intermediate of the side edges of the band and of greater length than the wall thickness of the tubular members and adapted to space apart the ends of the tubular members while said ends are being tack welded together, the assembly of band and studs including portions of low resistance to breaking to permit breaking off from the assembly at least the portions of the studs extending more than the wall thickness of the tubular members from the band after the tubular members are tack welded together.

4. A device for use in welding together the ends of a pair of tubular members, said device including an expansible ring formed of a metal band adapted to be telescoped into the ends of tubular members to be welded together, said band having a plurality of outwardly extending studs intermediate of the side edges of the band and of greater length than the wall thickness of the tubular members and adapted to space apart the ends of the tubular members while said ends are being tack welded together, the assembly of band and studs including portions of low resistance to breaking and disposed between the outer surface of said band and points on said studs at a distance from the outer surface of said band not greater than the wall thickness of the tubular members to permit breaking off the studs after the tubular members are tack welded together.

ARTHUR R. C. MARKL.

REFERENCES CITED

The following references are of record in the file of this patent:

UNITED STATES PATENTS

| Number | Name | Date |
|---|---|---|
| Re. 22,725 | Von Ahrens | Feb. 19, 1946 |
| 1,939,772 | Greene | Dec. 19, 1933 |
| 1,980,561 | Wagner | Nov. 13, 1934 |
| 2,171,078 | Cline | Aug. 29, 1939 |
| 2,317,734 | Cook | Apr. 27, 1943 |